US008659568B2

(12) United States Patent
Krah et al.

(10) Patent No.: US 8,659,568 B2
(45) Date of Patent: *Feb. 25, 2014

(54) SCAN SEQUENCE GENERATOR

(75) Inventors: Christoph Horst Krah, Los Altos, CA (US); Minh-Dieu Thi Vu, Cupertino, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/553,421

(22) Filed: Jul. 19, 2012

(65) Prior Publication Data
US 2012/0280932 A1    Nov. 8, 2012

Related U.S. Application Data

(63) Continuation of application No. 11/650,046, filed on Jan. 3, 2007, now Pat. No. 8,232,970.

(51) Int. Cl.
*G09G 5/00* (2006.01)
(52) U.S. Cl.
USPC ...... 345/173; 345/178; 178/18.01; 178/18.06
(58) Field of Classification Search
USPC ............ 345/173–178; 178/18.01–18.06
See application file for complete search history.

(56) References Cited

U.S. PATENT DOCUMENTS

| 4,853,498 | A |  | 8/1989 | Meadows et al. |
| 4,922,061 | A |  | 5/1990 | Meadows et al. |
| 5,483,261 | A |  | 1/1996 | Yasutake |
| 5,488,204 | A |  | 1/1996 | Mead et al. |
| 5,790,107 | A | * | 8/1998 | Kasser et al. ............ 345/174 |
| 5,825,352 | A |  | 10/1998 | Bisset et al. |
| 5,835,079 | A |  | 11/1998 | Shieh |
| 5,880,411 | A |  | 3/1999 | Gillespie et al. |
| 5,920,309 | A |  | 7/1999 | Bisset et al. |
| 6,188,391 | B1 |  | 2/2001 | Seely et al. |
| 6,310,610 | B1 |  | 10/2001 | Beaton et al. |
| 6,323,846 | B1 |  | 11/2001 | Westerman et al. |
| 6,380,931 | B1 | * | 4/2002 | Gillespie et al. ............ 345/173 |
| 6,559,658 | B1 | * | 5/2003 | Brandt ..................... 324/681 |

(Continued)

FOREIGN PATENT DOCUMENTS

| EP | 0 818 751 A1 | 1/1998 |
| EP | 1 387 242 A2 | 2/2004 |

(Continued)

OTHER PUBLICATIONS

Final Office Action mailed May 3, 2011, for U.S. Appl. No. 11/650,046, filed Jan. 3, 2007, nine pages.

(Continued)

*Primary Examiner* — Jennifer Nguyen
(74) *Attorney, Agent, or Firm* — Morrison & Foerster LLP

(57) ABSTRACT

A sensor panel device that can generate and use a stimulus signal having multiple different waveforms for detecting events on or near the sensor panel is disclosed. Among other things, such a stimulus signal can be used to reject environmental noise present in the device. In some embodiments, the stimulus signal has multiple waveforms having different frequencies. Logic circuitry can generate representative values from output of the different waveforms applied to one or more sensing nodes in the sensor panel device. From the representative values, a final value can be generated that represents whether an event occurred at or near the one or more sensing nodes.

43 Claims, 9 Drawing Sheets

(56) References Cited

U.S. PATENT DOCUMENTS

| | | | |
|---|---|---|---|
| 6,583,676 B2 * | 6/2003 | Krah et al. ................. 331/74 |
| 6,690,387 B2 | 2/2004 | Zimmerman et al. |
| 7,015,894 B2 | 3/2006 | Morohoshi |
| 7,031,886 B1 | 4/2006 | Hargreaves |
| 7,184,064 B2 | 2/2007 | Zimmerman et al. |
| 7,277,087 B2 | 10/2007 | Hill et al. |
| 7,372,455 B2 | 5/2008 | Perski et al. |
| 7,643,011 B2 | 1/2010 | O'Connor et al. |
| 7,649,524 B2 | 1/2010 | Haim et al. |
| 7,663,607 B2 | 2/2010 | Hotelling et al. |
| 7,859,522 B2 | 12/2010 | Takahashi et al. |
| 8,232,970 B2 * | 7/2012 | Krah et al. ................. 345/173 |
| 2002/0196066 A1 | 12/2002 | Krah et al. |
| 2005/0052427 A1 | 3/2005 | Wu et al. |
| 2005/0146513 A1 | 7/2005 | Hill et al. |
| 2006/0026521 A1 | 2/2006 | Hotelling et al. |
| 2006/0197753 A1 | 9/2006 | Hotelling |
| 2008/0018618 A1 | 1/2008 | Hill et al. |
| 2008/0062147 A1 | 3/2008 | Hotelling et al. |
| 2008/0156546 A1 | 7/2008 | Hauck |
| 2008/0157882 A1 | 7/2008 | Krah |
| 2008/0158180 A1 | 7/2008 | Krah et al. |
| 2008/0162997 A1 | 7/2008 | Vu et al. |

FOREIGN PATENT DOCUMENTS

| | | |
|---|---|---|
| EP | 1 387 242 A3 | 2/2004 |
| JP | 2000-163031 A | 6/2000 |
| JP | 2002-342033 A | 11/2002 |
| WO | WO-2008/085416 A1 | 7/2008 |

OTHER PUBLICATIONS

International Search Report mailed Jun. 11, 2008, for PCT Application No. PCT/US2007/026177, filed Dec. 21, 2007, three pages.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed Jun. 8, 2010, for U.S. Appl. No. 11/650,046, filed Jan. 3, 2007, 11 pages.

Non-Final Office Action mailed Nov. 22, 2010, for U.S. Appl. No. 11/650,046, filed Jan. 3, 2007, 10 pages.

Notice of Allowance mailed Mar. 28, 2012, for U.S. Appl. No. 11/650,046, filed Jan. 3, 2007, seven pages.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

SCAN SEQUENCE GENERATOR

CROSS-REFERENCE TO RELATED APPLICATIONS

This application is a continuation of U.S. patent application Ser. No. 11/650,046, filed on Jan. 3, 2007, the disclosure of which is herein incorporated by reference in its entirety for all purposes.

FIELD OF THE INVENTION

The present invention relates generally to electronic devices (e.g., touch screen devices) capable of generating dynamic scan signals, and more particularly, to a method and system of using scan signals having different frequencies when scanning a sensor panel of an electronic device.

BACKGROUND OF THE INVENTION

Many types of input devices are presently available for performing operations in a computing system, such as buttons or keys, mice, trackballs, touch panels, joysticks, touch screens and the like. Touch screens, in particular, are becoming increasingly popular because of their ease and versatility of operation as well as their declining price. Touch screens may include a touch panel, which may be a clear panel with a touch-sensitive surface. The touch panel may be positioned in front of a display screen so that the touch-sensitive surface covers the viewable area of the display screen. Touch screens may allow a user to make selections and move a cursor by simply touching the display screen via a finger or stylus. In general, the touch screen may recognize the touch and position of the touch on the display screen, and the computing system may interpret the touch and thereafter perform an action based on the touch event.

One limitation of many conventional touch panel technologies is that they are only capable of reporting a single point or touch event, even when multiple objects come into contact with the sensing surface. That is, they lack the ability to track multiple points of contact at the same time. Thus, even when two points are touched, these conventional devices only identify a single location, which is typically the average between the two contacts (e.g., a conventional touchpad on a notebook computer provides such functionality). This single-point identification is a function of the way these devices provide a value representative of the touch point, which is generally by providing an average resistance or capacitance value.

Moreover, noise may adversely affect the performance of a touch panel device. Environmental noise, either naturally occurring or human made (e.g., wireless transmissions), may influence the results of a touch panel device. For example, environmental noise may prevent a touch panel from distinguishing between a touch event (e.g., a user's contact of a touch panel) and noise influencing the sensors of the touch panel.

SUMMARY OF THE INVENTION

A multi-touch touch system is disclosed herein. One aspect of the multi-touch touch system relates to stimulating the multi-touch sensors with multiple different waveforms and generating representative values of the waveforms Another aspect of the multi-touch system relates distinguishing a user's contacts from environmental noise, or other undesirable noise that may influence detection of a touch event.

Yet another aspect of the multi-touch system relates to adjusting scan frequencies for consecutive scans. For example, a scan order my be low frequency-medium frequency-high frequency-high frequency-medium frequency-low frequency.

A further aspect of the multi-touch system relates to channel scan logic scanning a given row of a multi-touch panel at a lower frequency band, then a medium frequency band, and a high frequency band.

DETAILED DESCRIPTION OF THE PREFERRED EMBODIMENT

Figure 1:
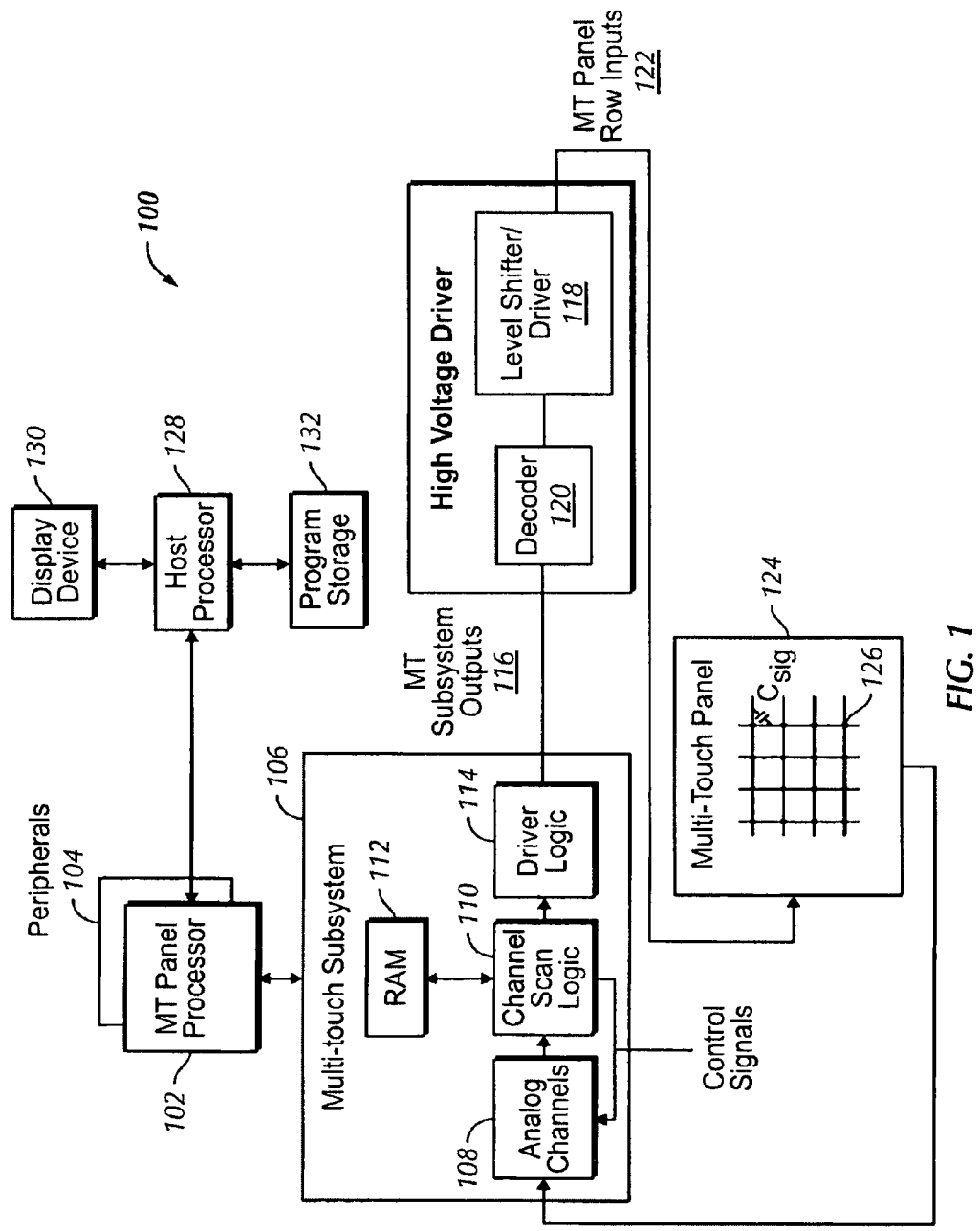
FIG. 1 illustrates an exemplary computing system using a multi-touch panel input device in accordance with one embodiment of the present invention.

In the following description of preferred embodiments, reference is made to the accompanying drawings which form a part hereof, and in which it is shown by way of illustration specific embodiments in which the invention may be practiced. It is to be understood that other embodiments may be used and structural changes may be made without departing from the scope of the preferred embodiments of the present invention.

A plurality of touch sensors in a multi-touch panel can enable a computing system to sense multi-touch events (the touching of fingers or other objects upon a touch-sensitive surface at distinct locations at about the same time) and perform additional functions not previously available with touch sensor devices.

Although some embodiments may be described herein in terms of capacitive touch sensors in a multi-touch panel, it should be understood that embodiments of the invention are not so limited, but are generally applicable to the use of any type of multi-touch sensor technology that may include resistive touch sensors, surface acoustic wave touch sensors, electromagnetic touch sensors, near field imaging touch sensors, and the like. Furthermore, although the touch sensors in the multi-touch panel may be described herein in terms of an orthogonal array of touch sensors having rows and columns, it should be understood that embodiments of the invention are not limited to orthogonal arrays, but may be generally applicable to touch sensors arranged in any number of dimensions and orientations, including diagonal, concentric circle, and three-dimensional and random orientations.

In general, multi-touch panels may be able to detect multiple touches (touch events or contact points) that occur at or about the same time, and identify and track their locations. Examples of multi-touch panels are described in Applicant's U.S. application Ser. No. 10/840,862 entitled "Multipoint Touchscreen," filed on May 6, 2004 and published as U.S. Published Application No. 2006/0097991 on May 11, 2006, now issued as U.S. Pat. No. 7,663,607, issued on Feb. 16, 2010, the contents of which are incorporated by reference herein.

It should be understood that although embodiments of this invention are primarily described herein for use with touch sensor panels, proximity sensor panels may also be used to generate modulated output signals for detection by the analog channels. Proximity sensor panels are described in Applicants' concurrently filed U.S. application Ser. No. 11/649, 966 entitled "Proximity and Multi-Touch Sensor Detection and Demodulation," filed on Jan. 3, 2007, now issued as U.S. Pat. No. 7,719,367, issued on May 18, 2010, the contents of which are incorporated herein by reference.

In view of the above, although this disclosure may describe detecting input in terms of touch-events, it should be understood that the various embodiments disclosed herein may detect near touches or hover-events as well. Accordingly, a touch, a near-touch or a hover may be referred to as an "event" and multiple events that occur at or about the same time may be referred to as a "multi-event."

FIG. 1 illustrates computing system 100 using touch sensors according to one embodiment. Computing system 100 may correspond to computing devices such as desktops, laptops, tablets or handhelds, including personal digital assistants (PDAs), digital music and/or video players and cellular telephones. Computing system 100 may also correspond to public computer systems such as information kiosks, automated teller machines (ATM), point of sale machines (POS), industrial machines, gaming machines, arcade machines, vending machines, airline e-ticket terminals, restaurant reservation terminals, customer service stations, library terminals, learning devices, and the like.

Computing system 100 may include one or more multi-touch panel processors 102 and peripherals 104, and multi-touch subsystem 106. The one or more processors 102 can be ARM968 processors or other processors with similar functionality and capabilities. However, in other embodiments, the multi-touch panel processor functionality may be implemented instead by dedicated logic such as a state machine. Peripherals 104 may include, but are not limited to, random access memory (RAM) or other types of memory or storage, watchdog timers and the like. Multi-touch subsystem 106 may include, but is not limited to, one or more analog channels 108, channel scan logic 110 and driver logic 114. Channel scan logic 110 may access RAM 112, autonomously read data from the analog channels and provide control for the analog channels. This control may include multiplexing columns of multi-touch panel 124 to analog channels 108. In addition, channel scan logic 110 may control the driver logic and stimulation signals being selectively applied to rows of multi-touch panel 124. In some embodiments, multi-touch subsystem 106 may be integrated into a single application specific integrated circuit (ASIC).

Driver logic 114 can provide multiple multi-touch subsystem outputs 116 and can present a proprietary interface that drives high voltage driver, which is comprised of decoder 120 and subsequent level shifter and driver stage 118, although level-shifting functions could be performed before decoder functions. Level shifter and driver 118 can provide level shifting from a low voltage level (e.g. CMOS levels) to a higher voltage level, providing a better signal-to-noise (S/N) ratio for noise reduction purposes. Decoder 120 can decode the drive interface signals to one out of N outputs, whereas N is the maximum number of rows in the panel. Decoder 120 can be used to reduce the number of drive lines needed between the high voltage driver and multi-touch panel 124. Each multi-touch panel row input 122 can drive one or more rows in multi-touch panel 124. In some embodiments, driver 118 and decoder 120 can be integrated into a single ASIC. However, in other embodiments driver 118 and decoder 120 can be integrated into driver logic 114, and in still other embodiments driver 118 and decoder 120 can be eliminated entirely.

Multi-touch panel 124 can in some embodiments include a capacitive sensing medium having a plurality of row traces or driving lines and a plurality of column traces or sensing lines, although other sensing media may also be used. The row and column traces may be formed from a transparent conductive medium, such as Indium Tin Oxide (ITO) or Antimony Tin Oxide (ATO), although other transparent and non-transparent materials, such as copper, can also be used. In some embodiments, the row and column traces can be formed on opposite sides of a dielectric material, and can be perpendicular to each other, although in other embodiments other non-orthogonal orientations are possible. For example, in a polar coordinate system, the sensing lines can be concentric circles and the driving lines can be radially extending lines (or vice versa). It should be understood, therefore, that the terms "row" and "column," "first dimension" and "second dimension," or "first axis" and "second axis" as used herein are intended to encompass not only orthogonal grids, but the intersecting traces of other geometric configurations having first and second dimensions (e.g. the concentric and radial lines of a polar-coordinate arrangement). It should also be noted that in other embodiments, the rows and columns can be formed on a single side of a substrate, or can be formed on two separate substrates separated by a dielectric material. In some embodiments, the dielectric material can be transparent, such as glass, or can be formed from other materials, such as mylar. An additional dielectric cover layer may be placed over the row or column traces to strengthen the structure and protect the entire assembly from damage.

At the "intersections" of the traces, where the traces pass above and below each other (but do not make direct electrical contact with each other), the traces essentially form two electrodes (although more than two traces could intersect as well). Each intersection of row and column traces can represent a capacitive sensing node and can be viewed as picture element (pixel) 126, which can be particularly useful when multi-touch panel 124 is viewed as capturing an "image" of touch. (In other words, after multi-touch subsystem 106 has determined whether a touch event has been detected at each touch sensor in the multi-touch panel, the pattern of touch sensors in the multi-touch panel at which a touch event occurred can be viewed as an "image" of touch (e.g. a pattern of fingers touching the panel).) The capacitance between row and column electrodes appears as a stray capacitance on all columns when the given row is held at DC and as a mutual capacitance Csig when the given row is stimulated with an AC signal. The presence of a finger or other object near or on the multi-touch panel can be detected by measuring changes to Csig. The columns of multi-touch panel 124 can drive one or more analog channels 108 (also referred to herein as event detection and demodulation circuits) in multi-touch subsystem 106. In some embodiments, each column is coupled to one dedicated analog channel 108. However, in other embodiments, the columns may be couplable via an analog switch to a fewer number of analog channels 108.

Computing system 100 can also include host processor 128 for receiving outputs from multi-touch panel processor 102 and performing actions based on the outputs that may include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 may also perform additional functions that may not be related to multi-touch panel processing, and can be coupled to program storage 132 and display device 130 such as an LCD display for providing a user interface (UI) to a user of the device.

Figure 2A:
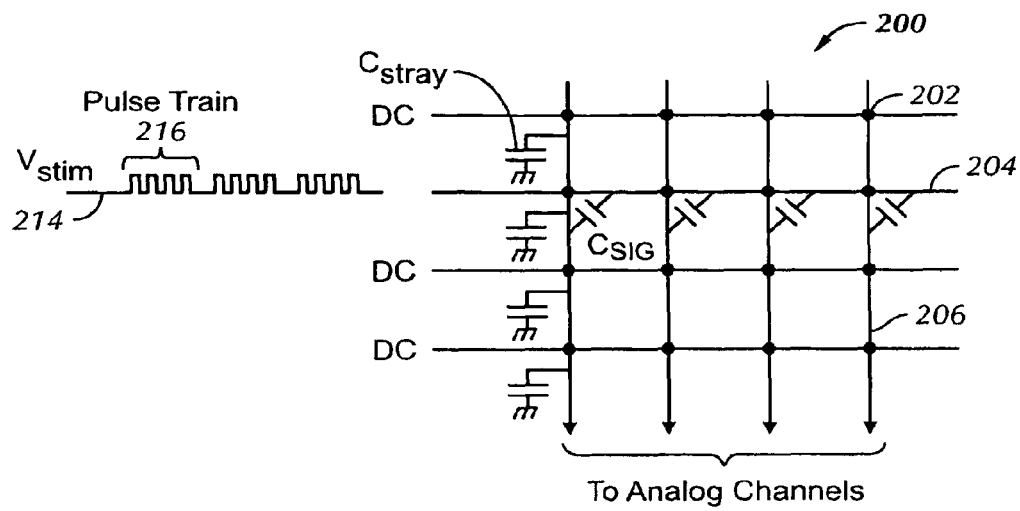
FIG. 2a illustrates an exemplary capacitive multi-touch panel in accordance with one embodiment of the present invention.

FIG. 2a illustrates exemplary capacitive multi-touch panel 200. FIG. 2a indicates the presence of a stray capacitance Cstray at each pixel 202 located at the intersection of a row 204 and a column 206 trace (although Cstray for only one column is illustrated in FIG. 2 for purposes of simplifying the figure). Note that although FIG. 2a illustrates rows 204 and columns 206 as being substantially perpendicular, they need not be so aligned, as described above. In the example of FIG. 2a, AC stimulus Vstim 214 is being applied to one row, with all other rows connected to DC. The stimulus causes a charge to be injected into the column electrodes through mutual capacitance at the intersecting points. This charge is Qsig=Csig×Vstm. Each of columns 206 may be selectively connectable to one or more analog channels (see analog channels 108 in FIG. 1).

Figure 2B:
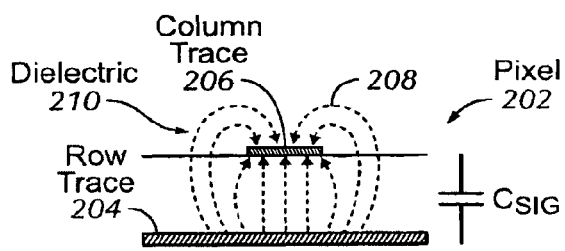
FIG. 2b is a side view of an exemplary capacitive touch sensor or pixel in a steady-state (no-touch) condition in accordance with one embodiment of the present invention.

FIG. 2b is a side view of exemplary pixel 202 in a steady-state (no-touch) condition. In FIG. 2b, an electric field of electric field lines 208 of the mutual capacitance between column 206 and row 204 traces or electrodes separated by dielectric 210 represents a signal capacitance Csig between the row and column electrodes and can cease a charge to be injected form a stimulated row to a column electrode. Since Csig is referenced to virtual ground, it also makes up a stray capacitance. For example, a total stray capacitance of a column electrode can be the sum of all signal capacitances Csig between a given column and all row electrodes. Assuming that CSig is for example 0.75 pF and a column electrode is intersected by fifteen row electrodes, the total stray capacitance on that column electrode would be at least 15×0.75 pF=11.25 pF. In reality, however, the total stray capacitance can be larger due to a trace stray capacitance between the column electrode and other conductors in the system held at a DC potential. Such connectors can include ground planes on a PCB or EMI shield.

Figure 2C:
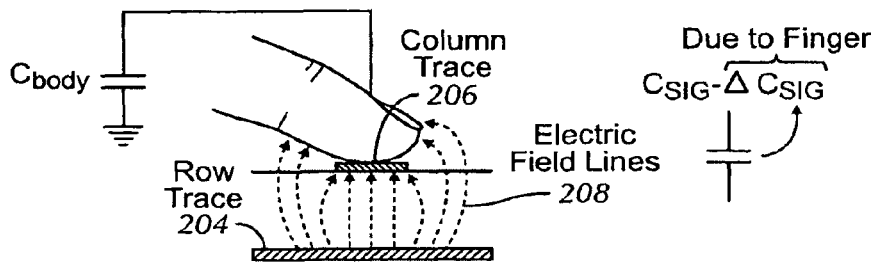
FIG. 2c is a side view of the exemplary capacitive touch sensor or pixel in a dynamic (touch) condition in accordance with one embodiment of the present invention.

FIG. 2c is a side view of exemplary pixel 202 in a dynamic (touch) condition. In FIG. 2c, finger 212 has been placed near pixel 202. Finger 212 is a low-impedance object at signal frequencies, and represents an CA ground return path to via body capacitance Cbody. The body has a self-capacitance to ground Cbody, which is a function of, among other things, body size and geometry. If finger 212 blocks some electric field lines 208 between the row and column electrodes (those fringing fields that exit the dielectric and pass through the air above the row electrode), those electric field lines are shunted to ground through the capacitance path inherent in the finger and the body, and as a result, the steady state signal capacitance Csig is reduced by Csig_sense. In other words, the combined body and finger capacitance act to reduce Csig by an amount ΔCsig (which can also be referred to herein as Csig_sense), and can act as a shunt or dynamic return path to ground, blocking some of the electric fields as resulting in a reduced net signal capacitance. The signal capacitance at the pixel becomes Csig-ΔCsig, where Csig represents the static (no touch) component and ΔCsig represents the dynamic (touch) component. Note that Csig−ΔCsig may always be nonzero due to the inability of a finger, palm or other object to block all electric fields, especially those electric fields that remain entirely within the dielectric material. In addition, it should be understood that as a finger is pushed harder or more completely onto the multi-touch panel, the finger can tend to flatten, blocking more and more of the electric fields, and thus ΔCsig can be variable and representative of how completely the finger is pushing down on the panel (i.e. a range from "no-touch" to "full-touch").

Referring again to FIG. 2a, as mentioned above, Vstim signal 214 can be applied to a row in multi-touch panel 200 so that a change in signal capacitance can be detected when a finger, palm or other object is present. Vstim signal 214 can include one or more pulse trains 216 at a particular frequency, with each pulse train including of a number of pulses. Although pulse trains 216 are shown as square waves, other waveshapes such as sine waves can also be employed. A plurality of pulse trains 216 at different frequencies can be transmitted for noise reduction purposes to minimize the effect of any noise sources. Vstim signal 214 essentially injects a charge into the row via signal capacitance Csig, and can be applied to one row of multi-touch panel 200 at a time while all other rows are held at a DC level. However, in other embodiments, the multi-touch panel may be divided into two or more sections, with Vstim signal 214 being simultaneously applied to one row in each section and all other rows in that region section held at a DC voltage.

Each analog channel coupled to a column can provide a result representing a mutual capacitance between a row being stimulated and a column the row is connected to. Specifically, this mutual capacitance is comprised of the signal capacitance Csig and any change Csig_sense in that signal capacitance due to the presence of a finger, palm or other body part or object. These column values provided by the analog channels may be provided in parallel while a single row is being stimulated, or may be provided in series. If all of the values representing the signal capacitances for the columns have been obtained, another row in multi-touch panel 200 can be stimulated with all others held at a DC voltage, and the column signal capacitance measurements can be repeated. Eventually, if Vstim has been applied to all rows, and the signal capacitance values for all columns in all rows have been captured (i.e. the entire multi-touch panel 200 has been "scanned"), a "snapshot" of all pixel values can be obtained for the entire multi-touch panel 200. This snapshot data can be initially saved in the multi-touch subsystem, and later transferred out for interpretation by other devices in the computing system such as the host processor. As multiple snapshots are obtained, saved and interpreted by the computing system, it is possible for multiple touches to be detected, tracked, and used to perform other functions.

Figure 3A:
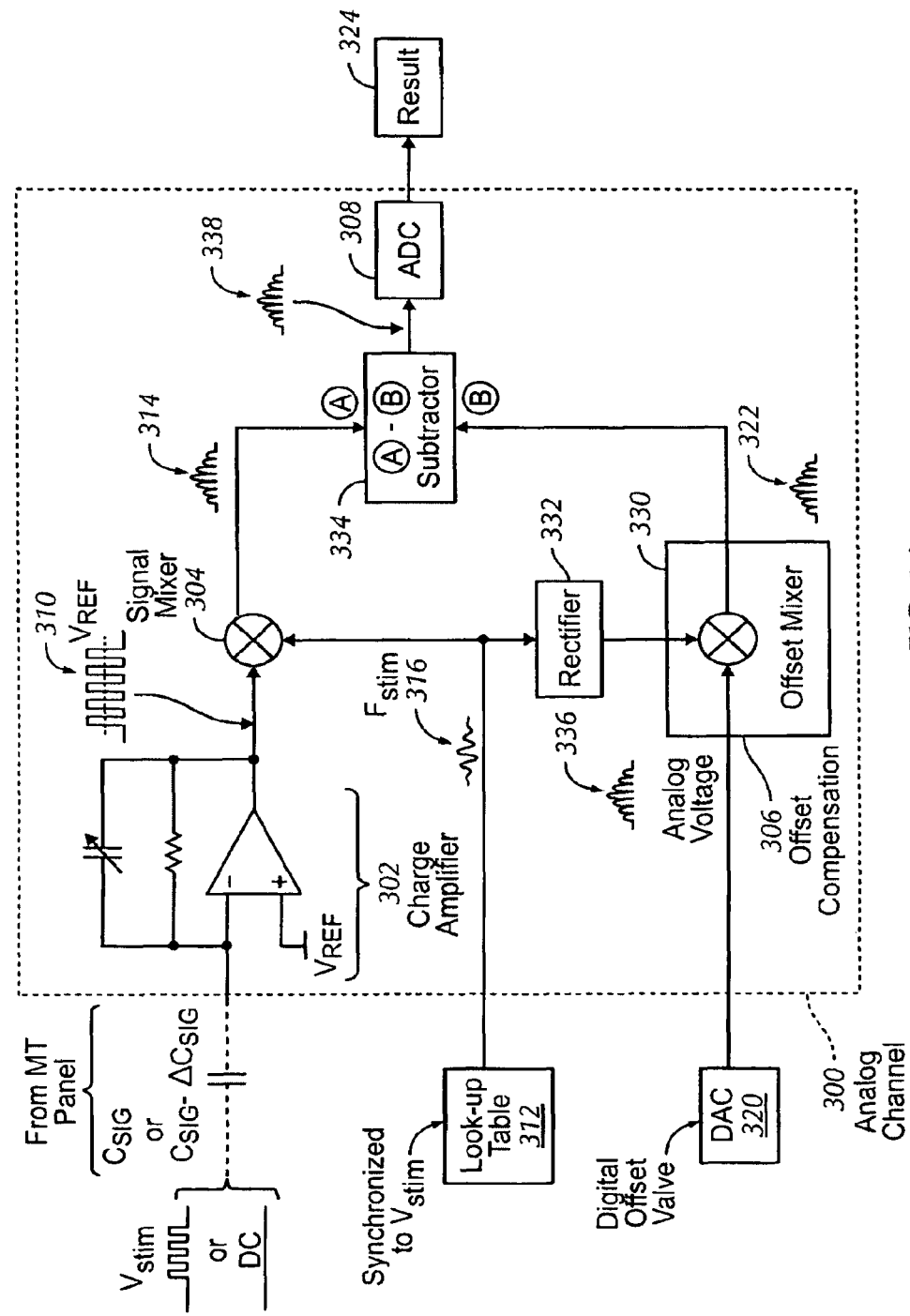
FIG. 3a illustrates an exemplary analog channel in accordance with one embodiment of the present invention.

FIG. 3a illustrates exemplary analog channel or event detection and demodulation circuit 300. One or more analog channels 300 can be present in the multi-touch subsystem. One or more columns from a multi-touch panel can be connectable to each analog channel 300. Each analog channel 300 can include virtual-ground charge amplifier 302, signal mixer 304, offset compensation 306, rectifier 332, subtractor 334, and analog-to-digital converter (ADC) 308. FIG. 3a also shows, in dashed lines, the steady-state signal capacitance Csig that can be contributed by a multi-touch panel column connected to analog channel 300 when an input stimulus Vstim is applied to a row in the multi-touch panel and no finger, palm or other object is present, and the dynamic signal capacitance Csig−ΔCsig that can appear when a finger, palm or other object is present.

Vstim, as applied to a row in the multi-touch panel, can be generated as a burst of square waves or other non-DC signaling in an otherwise DC signal, although in some embodiments the square waves representing Vstim can be preceded and followed by other non-DC signaling. If Vstim is applied to a row and a signal capacitance is present at a column connected to analog channel 300, the output of charge amplifier 302 can be pulse train 310 centered at Vref with a peak-to-peak (p-p) amplitude in the steady-state condition that is a fraction of the p-p amplitude of Vstim, the fraction corresponding to the gain of charge amplifier 302, which is equivalent to the ratio of signal capacitance Csig and preamplifier feedback capacitance Cfb. For example, if Vstim includes 18V p-p pulses and the gain of the charge amplifier is 0.1, then the output of the charge amplifier can be 1.8V p-p pulses. This output can be mixed in signal mixer 304 with demodulation waveform Fstim 316.

Since the stimulation signal can be a square wave, it may be advantageous to use a sinusoidal demodulation waveform to remove the harmonics of the square wave. In order to reduce the stop band ripple of the mixer at a given stimulation frequency, it can be advantageous to use a Gaussian shaped sinewave. The demodulation waveform can have the same frequency as the stimulus Vstim and can be synthesised from a Lookuptable, enabling generation of any shape of demodulation waveform. Besides Gaussian shaped sinewaves, other waveshapes may be programmed to tune the filter characteristics of the mixers. In some embodiments, Fstim 316 may be tunable in frequency and amplitude by selecting different digital waveforms in the LUT 312 or generating the waveforms differently using other digital logic. Signal mixer 304 may demodulate the output of charge amplifier 310 by subtracting Fstim 316 from the output to provide better noise rejection. Signal mixer 304 may reject all frequencies outside the passband, which may in one example be about +/−15 kHz around Fstim. This noise rejection may be beneficial in noisy environment with many sources of noise, such as 802.11, Bluetooth and the like, all having some characteristic frequency that may interfere with the sensitive (femto-farad level) analog channel 300. Since the frequency of the signals going into the signal mixer can have the same frequency, the signal mixer may be thought of as a synchronous rectifier, such that the output of the signal mixer is essentially a rectified waveform.

Offset compensation 306 can then be applied to signal mixer output 314, which can remove the effect of the static Csig, leaving only the effect of ΔCsig appearing as result 324. Offset compensation 306 can be implemented using offset mixer 330. Offset compensation output 322 can be generated by rectifying Fstim 316 using rectifier 332, and mixing rectifier output 336 with analog voltage from a digital-to-analog converter (DAC) 320 in offset mixer 330. DAC 320 can generate the analog voltage based on a digital value selected to increase the dynamic range of analog channel 300. Offset compensation output 322, which can be proportional to the analog voltage from DAC 320, can then be subtracted from signal mixer output 314 using subtractor 334, producing subtractor output 338 which can be representative of the change in the signal capacitance ΔCsig that occurs when a capacitive sensor on the row being stimulated has been touched. Subtractor output 338 is then integrated and can then be converted to a digital value by ADC 308. In some embodiments, integrator and ADC functions are combined and ADC 308 may be an integrating ADC, such as a sigma-delta ADC, which can sum a number of consecutive digital values and average them to generate result 324.

Figure 3B:
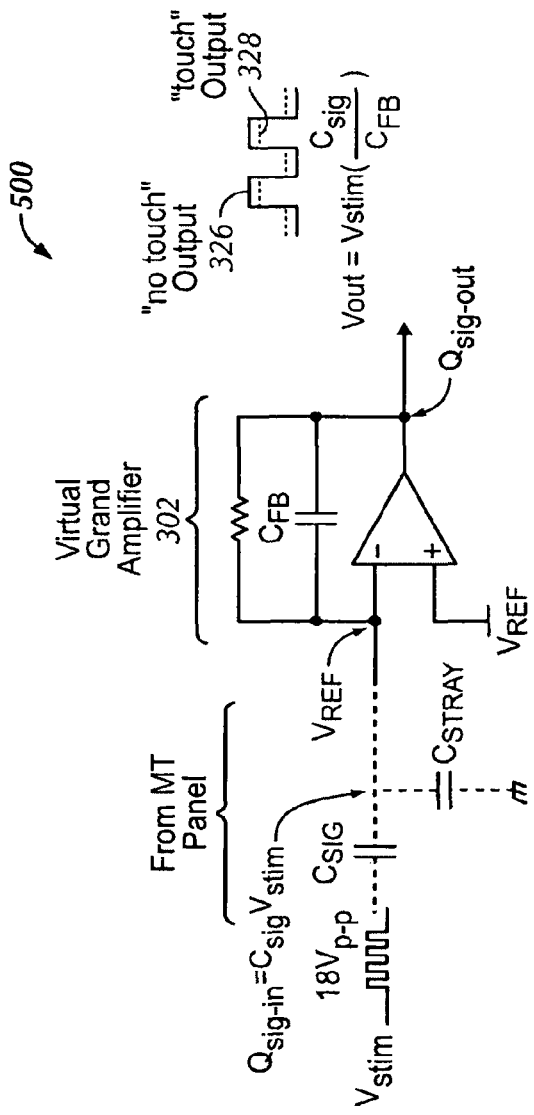
FIG. 3b is a more detailed illustration of a virtual ground charge amplifier at the input of an analog channel, and the capacitance contributed by a capacitive touch sensor and seen by the charge amplifier in accordance with one embodiment of the present invention.

FIG. 3b is a more detailed view of charge amplifier (a virtual ground amplifier) 302 at the input of an analog channel, and the capacitance that can be contributed by the multi-touch panel (see dashed lines) and seen by the charge amplifier. As mentioned above, there can be an inherent stray capacitance Cstray at each pixel on the multi-touch panel. In virtual ground amplifier 302, with the + (noninverting) input tied to Vref, the − (inverting) input is also driven to Vref, and a DC operating point is established. Therefore, regardless of how much Csig is present, the − input is always driven to Vref. Because of the characteristics of virtual ground amplifier 302, any charge Qstray that is stored in Cstray is constant, because the voltage across Cstray is kept constant by the charge amplifier. Therefore, no matter how much stray capacitance Cstray is added to the − input, the net charge into Cstray will always be zero. Accordingly, the input charge Qsig_sense=(Csig−ΔCsig_sense) Vstim is zero when the corresponding row is kept at DC and is purely a function of Csig and Vstim when the corresponding row is stimulated. In either case, because there is no charge across Csig, the stray capacitance is rejected, and it essentially drops out of any equations. Thus, even with a hand over the multi-touch panel, although Cstray can increase, the output will be unaffected by the change in Cstray.

The gain of virtual ground amplifier 302 is usually small (e.g. 0.1) and is equivalent to the ratio of Csig (e.g. 2 pF) and feedback capacitor Cfb (e.g. 20 pF). The adjustable feedback capacitor Cfb converts the charge Qsig to the voltage Vout. Therefore, the output Vout of virtual ground amplifier 302 is a voltage that is equivalent to the ratio of −Csig/Cfb multiplied by Vstim referenced to Vref. The high voltage Vstim pulses can therefore appear at the output of virtual ground amplifier 302 as much smaller pulses having an amplitude identified by reference character 326. However, when a finger is present, the amplitude of the output can be reduced as identified by reference character 328, because the signal capacitance is reduced by ΔCsig.

For noise rejection purposes, it may be desirable to drive the multi-touch panel at multiple different frequencies. Because noise typically exists at a particular frequency (e.g., most wireless devices send bursts at a particular frequency), changing the scanning pattern may reduce the system's susceptibility to noise. Accordingly, in some embodiments, channels (e.g., rows) of the multi-touch panel may be stimulated with a plurality of pulse train bursts. For frequency rejection purposes, the frequency of the pulse trains may vary from one to the other.

Figure 3C:
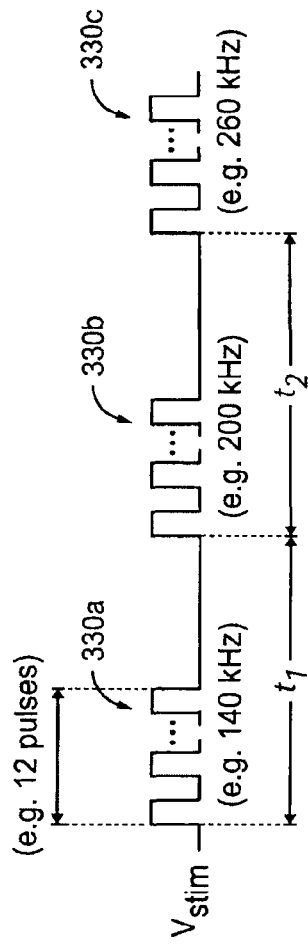
FIG. 3c illustrates an exemplary Vstim signal with multiple pulse trains each having a fixed number of pulses, each pulse train having a different frequency Fstim in accordance with one embodiment of the present invention.

FIG. 3c illustrates an exemplary stimulation signal Vstim with multiple pulse trains 330a, 330b, 330c, each of which have a fixed number of pulses, but have a different frequency Fstim (e.g., 140 kHz, 200 kHz, and 260 kHz). With multiple pulse trains at different frequencies, a different result may be obtained at each frequency. Thus, if a static interference is present at a particular frequency, the results of a signal at that frequency may be corrupted as compared to the results obtained from signals having other frequencies. The corrupted result or results can be eliminated and the remaining results used to compute a final result or, alternatively, all of the results may be used.

In one embodiment, noise rejection can be accomplished by providing multiple pulse trains at different frequencies and applying a "majority rules" algorithm to the result. In a majority rules algorithm, for each sensing node, the two or more values that provide the best amplitude match are averaged and any possibly corrupt values can be disposed of.

Figure 4:
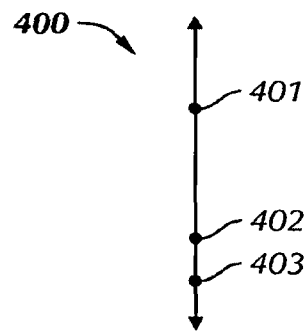
FIG. 4 illustrates noise rejection techniques employed by various filtering algorithms in accordance with one embodiment of the present invention.

As an example, in FIG. 4, vertical line 400 represents a range of measured capacitance, where one end of the range may represent larger values and the other end of the range may represent smaller values (or vice versa). Markings 401, 402, and 403 represent three values measured at three different stimulus frequencies Fstim. Values 402 and 403 provide the best match (because their respective values are closer to one another than with value 401), possibly suggesting that value 401 is corrupted. Thus, value 401 may be discarded and values 402 and 403 may averaged to form the output.

Alternatively, a median filter could be applied, in which case value 402 would be selected, i.e., the median value of the values shown in FIG. 4. As yet another alternative, all of the results can be averaged. Accordingly, the three results of FIG. 4 would have a resulting value somewhere between value 401 and 402. A variety of other noise rejection techniques for multiple sample values will be obvious to those skilled in the art, any of which may suitably be used with the controller described herein.

In an alternative embodiment, the timing between the pulse train bursts applied to a given channel may also vary. Referring back to FIG. 3c, the time between the beginning of first pulse train 330a and the beginning of second pulse train 330b applied to a channel is $t_1$. The time between the beginning of second pulse train 330b and the beginning of third pulse train 330c applied to that channel is $t_2$. In some embodiments the time $t_1$ may be the same as $t_2$, in other embodiments $t_1$ may be the less than $t_2$, and in further embodiments $t_1$ may be the greater than $t_2$. In this manner, varying the timing between pulse train bursts to a given channel may provide further noise rejection advantages. As would be appreciated by one skilled in the art, varying the time between bursts may similarly apply when applying more than three pulse train bursts to a given channel.

Figure 5:
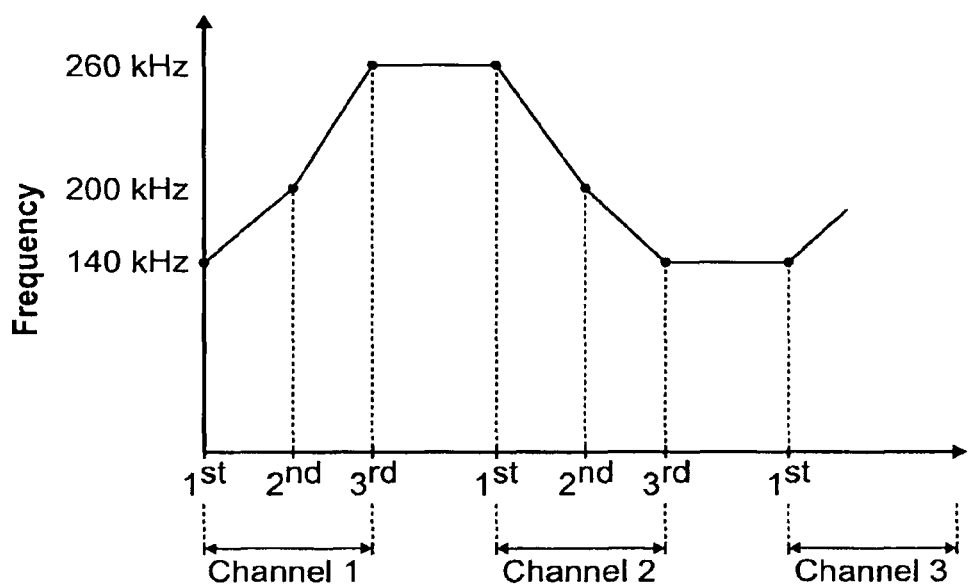
FIG. 5 illustrates a sequence in which stimulus waveforms of varying frequencies are applied to the multi-touch sensor in accordance with one embodiment of the present invention.

Additionally, it may be desirable to minimize the amount of stimulus frequency (Fstim) change required for each subsequent burst. Therefore, a frequency variation pattern that minimizes the changes may be used. FIG. 5 shows one possible frequency variation pattern where the stimulus frequency Fstim changes from Low-Medium-High-High-Medium-Low and so forth. In this arrangement, a first channel is driven at a low frequency (e.g., a 104 kHz burst), then a medium frequency (e.g., a 200 kHz burst), and finally a high frequency (e.g., a 260 kHz burst). Then, a next channel may be driven with three bursts of high (260 kHz), medium (200 kHz), and low (140 kHz), respectively. This particular frequency variation pattern may keep changes between frequencies small and allow the frequency transitions to be smooth and glitch-free. In a variation to this frequency variation pattern, the timing between each burst may be varied as well, as discussed above.

In one embodiment, the frequencies for individual bursts are selected based on the passband characteristics of the mixer and the subsequent low pass filter. The width of the passband may be a function of the number of stimulus cycles and integration interval in a given burst and the shape of a synthesized demodulation waveform. Typically, the longer the integration time, the narrower the passband may be. The burst frequencies can be chosen to prevent overlap between the individual passbands. If, for example the passband is +/−15 KHz centered around a given stimulation frequency then the stimulation frequencies may be at least 30 Khz apart, otherwise the individual passbands are overlapping and any noise that will fall between the passbands would corrupt both frequency channels. For the +/−15 Khz passband, frequencies at 170 KHz, 200 KHz and 230 KHz can be chosen. However, to allow for some extra margin, some extra buffer (e.g. 5 Khz on each side of the individual passband) may be added. Accordingly, the stimulation frequencies can be 160 KHz, 200 KHz and 240 KHz.

The scan pattern shown in FIG. 5 represents a scan sequence for two consecutive rows being scanned, assuming each row can be scanned at 3 different frequencies. In one embodiment, more than two rows could be scanned and each row could be scanned at more than three frequencies. If the maximum number of rows is N and the maximum number of frequencies is M, then the total number of scan points would be N×M. A randomizer lookup table could store N×M pairs of data. Each data pair can be comprised of two values, one representing a clock divider value, which represents the ratio of the pixel clock and the stimulus clock, a second representing the time between consecutive scans expressed in number of pixel clock cycles. For example, for a pixel clock fpix=48 MHz and the first data pair (6, 10) out of the randomizer lookup table the channel scan logic would scan the 1st point in FIG. 5, with a scan frequency of 48/6=8 Mhz and instruct the channel scan logic to scan the next point in FIG. 5 after 10 pixel clock cycles. A register would be utilized to determine after how many scan points the row count would be incremented to start the next row scanning sequence. In the example of FIG. 5, for example, if it is desired to just scan three points per row, then the row counter would be incremented after the third point. The randomizer lookup table could essentially be used to randomize scan sequence in order to vary frequency channels and sequence on a row by row and frame by frame basis.

In yet another embodiment of this application, multiple scan sequences represented as points on FIG. 5 could be combined into one single scan sequence, where the frequency is continuously varied within one single scan. Specifically, the individual pulse trains shown in FIG. 3c could be combined into one single pulse train, but representing frequency components present in the three pulse trains shown. The resulting pulse train could therefore be a quasi random sequence or a frequency modulated signal.

Figure 10:
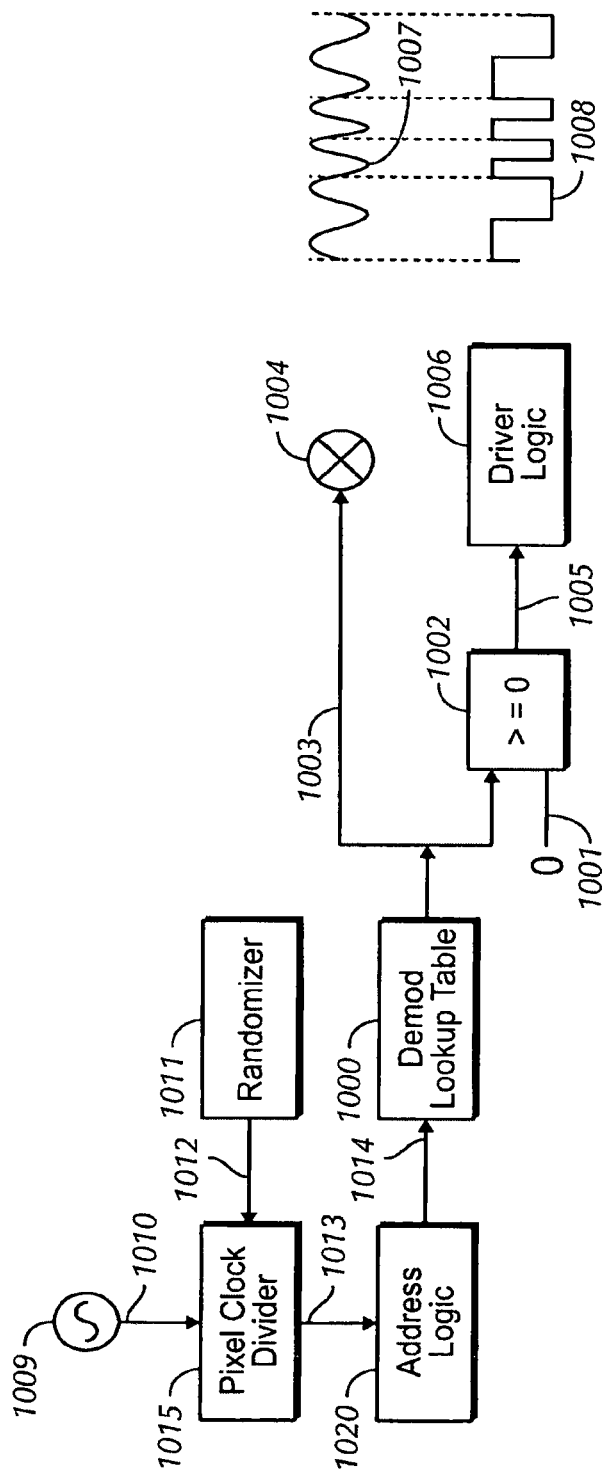
FIG. 10 is a block diagram of circuitry used to generate pulse trains in accordance with one embodiment of the present invention.

FIG. 10 shows a block diagram of pulse train randomizer circuitry. High frequency oscillator 1009 provides a high frequency clock 1010 which is divided down by a pixel clock divider 1015. The divide value 1012 is provided by a randomizer 1011 which includes a programmable lookup table with quasi random clock divide ratio data. Therefore, the rate of clock signal 1013, which is clocking the address logic 1020, can be a quasi randomly selected frequency which affects the rate at which the digital demodulation waveform 1007 is synthesized. In one embodiment, the resulting signal 1003 from demodulation lookup table 1000 is mixed by mixer 1004. A comparator 1002 functions as a zero crossing detector, generating a squarewave 1008 at its output 1005 that has the same frequency as the digitally synthesized demodulation waveform 1007. The output 1005 of the comparator provides the stimulation signal for the drive logic 1006. In an alternate embodiment, the clock signal 1013 provided to the address logic 1020 may be constant in frequency and the frequency of the demodulation waveform 1007 may be a function of the values programmed into the demodulation lookup table 1000 alone or a hybrid scheme may be used.

Figure 9:
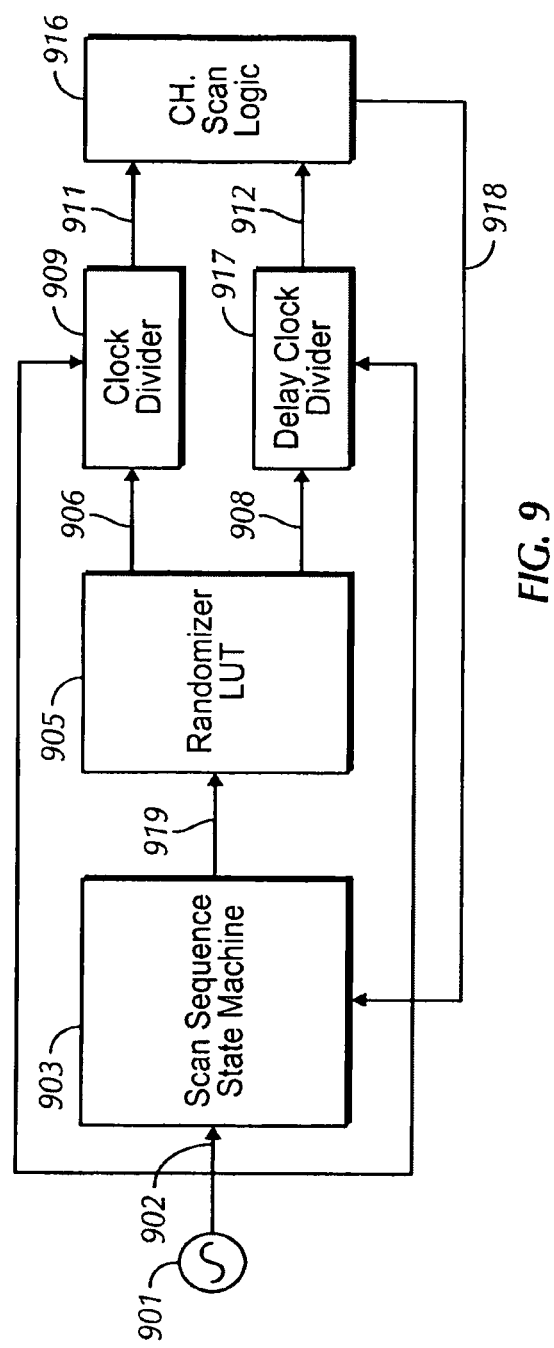
FIG. 9 is a block diagram of logic circuitry used to generate randomized stimulation pulses in accordance with one embodiment of the present invention.

Referring to FIG. 9, a high frequency oscillator 901 provides a clock source 902 to address logic 903 (referred to as scan sequence statemachine), pixel clock divider 909 and delay clock divider 917. Channel scan logic provides a start of sequence signal to the scan sequence statemachine 903 to initiate a scan sequence. Typically, the start of a sequence signal is either provided at the beginning of a new row sequence or at the beginning of a frame to be scanned. The channel scan logic 916 uses control bus 918 to reset the scan sequence state machine 903 at the beginning of a frame. The control bus 918 also contains a signal to advance the randomize lookup table address 905 retrieving the next pair of lookup table values (906, 908). Lookup table value 906 specifies a divide ratio between the clock source 902 and the pixel clock 911 which represents the scan frequency of the next scan sequence. Digital value 908 specifies the delay between the current and the next scan sequence.

Other frequency variation arrangements are also possible, including applying fewer than three stimulus frequencies Fstim at a given channel, applying more than three stimulus frequencies Fstim, applying the stimulus frequencies Fstim in a quasi random or random sequence rather than the ordered pattern described above, and adaptive frequency variation, in which the stimulus frequencies Fstim are selected based on the noise environment or previous noise results.

Multiple stimulus frequencies Fstims may be applied in different ways to the multi-touch panel. In some embodiments, the same Fstim may be sequentially applied to all channels (rows) (i.e., scanning one frame at a single stimulus frequency), and then repeated for the other, different frequencies. In other embodiments, a low, medium and high frequency Fstim may be applied to one channel, before moving on to the next channel. After an entire "image" is captured, it may be processed. In further embodiments, multiple stimuli (scan signals) are applied to different rows at the same time to speed up the process, which may be desirable for large multi-touch panels and when communications are USB, which could drop packets if too slow. Furthermore, Fstim may be programmable. In some embodiments, a lookup table may be used to synthesize a demodulation waveform. The feedback capacitance Cfb and offset may also be programmable.

The manner in which stimulus frequencies can be applied to the sensing nodes 126 of multi-touch panel 124 can be controlled by channel scan logic 110 or, alternatively, by the multi-touch panel processor. Other variations may also be used, as appreciated by those skilled in the art. An example of channel scan logic is described in Applicant's U.S. patent application Ser. No. 11/650,201 entitled "Channel Scan Logic," filed Jan. 3, 2007, now issued as U.S. Pat. No. 8,094,128, issued on Jan. 10, 2012, the contents of which are herein incorporated by reference.

Figure 6:
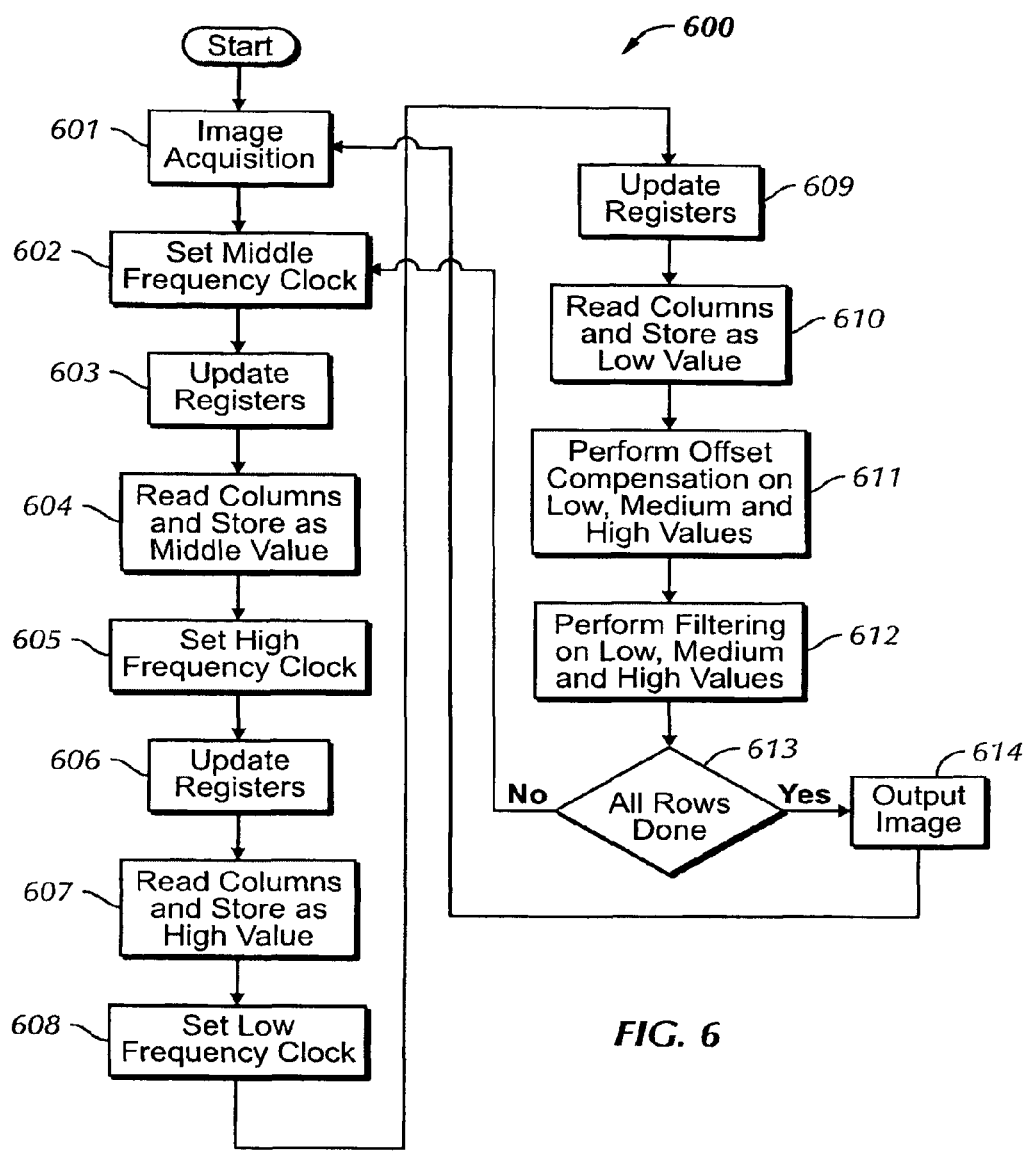
FIG. 6 is a flowchart illustrating operation of channel scan logic obtaining an image of a touch panel in accordance with one embodiment of the present invention.

Further understanding of the operation of the system 100 may be had with reference to an exemplary image acquisition process 600 illustrated in FIG. 6. One skilled in the art will appreciate that various timing and memory storage issues are omitted from this flowchart for the sake of clarity.

Image acquisition of a row of a touch sensitive panel (such as multi-touch panel 124 of FIG. 1) begins at block 601. The system then sets a clock so as to acquire samples at a middle clock frequency (e.g., 200 kHz) in block 602. Various programmable registers, which control such parameters as voltage offset, amplifier gain, delay clocks, etc., are then updated (block 603). Some or all of the columns (sensing lines) of the multi-touch panel are read, with the result stored as a middle result value (block 604). A high clock frequency is then set (block 605), and the steps of updating registers (block 606) and reading the columns and storing the result (block 607) are repeated for the high sample frequency. The clock is then set to the low frequency (step 608) and the register update (block 609) and column reading (block 610) are repeated for the low frequency.

The three result values (middle, high and low) may then be offset compensated, as described above (block 611). The offset compensated values may then be subjected to a filter, such as an averaging or median filter or any other suitable filtering technique, also as described above. In any case, a final result of the channel that was sampled is stored. If more rows remain, the process returns to the mid-frequency sampling at block 602. If all rows are completed (block 613), the entire image is output to the host device via, for example, the host processor 128 (block 614), and a subsequent new image is acquired (block 601).

Figure 7:
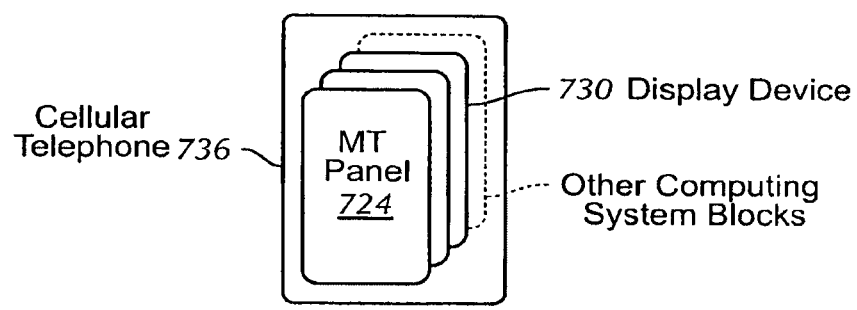
FIG. 7 illustrates an exemplary cellular telephone that may include multi-touch panel, display device, and other computing system blocks in accordance with one embodiment of the present invention.

FIG. 7 illustrates an exemplary mobile (e.g., cellular) telephone 736 that may include multi-touch panel 724, display device 730, and other computing system blocks in the computing system 100 of FIG. 1. In the example of FIG. 7a, if a user's cheek or ear is detected by one or more multi-touch panel sensors, computing system 100 may determine that mobile telephone 736 is being held up to the user's head, and therefore some or all of multi-touch subsystem 106 and multi-touch panel 124 may be powered down along with display device 130 to save power.

Figure 8:
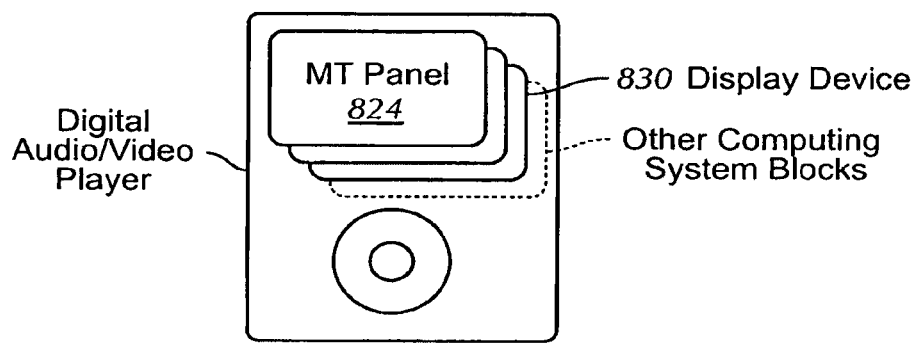
FIG. 8 illustrates an exemplary digital audio/video player that may include a multi-touch panel, a display device, and other computing system blocks in accordance with one embodiment of the present invention.

FIG. 8 illustrates an exemplary digital audio/video player that may include multi-touch panel 824, display device 830, and other computing system blocks in the computing system 100 of FIG. 1.

While this invention has been described in terms of several preferred embodiments, there are alterations, permutations, and equivalents, which fall within the scope of this invention. For example, the term "computer" does not necessarily mean any particular kind of device, combination of hardware and/or software, nor should it be considered restricted to either a multi purpose or single purpose device. Additionally, although the embodiments herein have been described in relation to touch screens, the teachings of the present invention are equally applicable to touch pads or any other touch surface type of sensor. Furthermore, although the disclosure is primarily directed at capacitive sensing, it should be noted that some or all of the features described herein may be applied to other sensing methodologies. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method of detecting events with a touch sensor panel device comprising:
    applying a stimulation signal having multiple different frequencies to a first touch sensing node of the touch sensor panel device to detect a position of an object touching the touch sensor panel device at or near the first touch sensing node;
    sensing output of the first touch sensing node for each frequency of the stimulation signal that was applied to the first touch sensing node;
    utilizing the output to determine a result indicative of the position of touch, near touch or hover location on the touch sensor panel device; and
    wherein applying the stimulation signal comprises selecting at least one of the multiple different frequencies to apply to the first sensing node of the touch sensor panel to reduce effects of a noise environment.

2. The method of claim 1, wherein the stimulation signal comprises a first and second stimulation signal each having multiple different frequencies and the method further comprising:
    applying the second stimulation signal to a second touch sensing node of the touch sensor panel device;
    sensing an output for each frequency of the second stimulation signal that was applied to the second touch sensing node; and
    determining a final result based on one or more of the outputs of the second stimulation signal.

3. The method of claim 2, wherein applying the first stimulation signal comprises applying a first of the multiple different frequencies to all channels of the touch sensor and subsequently applying a second of the multiple different frequencies to all channels of the touch sensor.

4. The method of claim 1, wherein the stimulation signal comprises a pulse train having multiple frequencies arranged in ascending and descending order.

5. The method of claim 1, wherein applying the stimulation signal comprises applying a first and a second of the multiple different frequencies to a first channels of the touch sensor and subsequently applying the first and the second of the multiple different frequencies to a second channel of the touch sensor.

6. The method of claim 1, wherein the step of utilizing the multiple outputs to determine the result comprises one of averaging at least two results or applying a majority rules algorithm to plural results.

7. The method of claim 1, wherein the step of utilizing the multiple outputs to determine the result comprises taking a median value of multiple results.

8. The method of claim 1, wherein the stimulation frequency comprises a first pulse train that is applied to the sensing node at a time t1, a second pulse train that is applied to the sensing node at a time t2 and a third pulse train that is applied to the sending node at a time t3, wherein t1 is before t2, t2 is before t3, and the time between t1 and t2 is different than the time between t2 and t3.

9. The method of claim 1, wherein utilizing the output comprises determining whether one or more outputs is corrupted and eliminating any corrupted output.

10. The method of claim 1, wherein each event comprises a touching event, a near touching event or a hovering event, the touch sensor panel device comprises a plurality of sensing nodes arranged in first directions and wherein applying the stimulation signal having multiple different frequencies comprising applying the frequencies to each of the plurality sensing nodes arranged in the first directions.

11. The method of claim 1, wherein applying the stimulation signal comprises applying a first and a second stimulations signal, each having multiple different frequencies, the method comprises applying the multiple different frequencies of the first stimulation signal in one of ascending or descending frequency order to a first plurality of sensing nodes arranged in a first direction, and the method further comprises applying the second stimulation signal comprising multiple different frequencies in the other of ascending or descending order to an adjacent plurality of sensing nodes arranged in the first direction.

12. The method of claim 1, wherein the selecting is done by adaptively selecting.

13. The method of claim 1, wherein the event sensitive panel device comprises drive lines and sense lines and the first sensing node is defined by the crossing of one of the drive lines and one of the sense lines and applying the stimulation signal to the first touch sensing node comprises applying the first stimulation signal to the one drive line.

14. A sensor panel device comprising:
    an event sensitive panel having at least one sense node;
    output circuitry operatively connected to the at least one sense node that generates stimulus signals having multiple different frequencies, at least one of the multiple different frequencies selected to reduce effects of a noise environment of the sensor panel device, the at least one sense node providing multiple outputs in response to the multiple different frequencies for at least one event to detect a position of touching of the sensor panel or nearly touching the sensor panel; and
    input circuitry operatively connected to the at least one sense node to receive the multiple outputs, the input circuitry configured to measure the results of any stimulus signals applied to the at least one sense node to determine a position of touch or near touch based on all or a plurality of the received multiple outputs.

15. The sensor panel device of claim 14, wherein the stimulus signals comprises a pulse train having multiple frequencies arranged in ascending and descending order.

16. The sensor panel device of claim 14, wherein the output circuitry applies a first of the multiple different frequencies to all channels of the sensor panel device and subsequently applying a second of the multiple different frequencies to all the channels of the sensor panel device.

17. The sensor panel device of claim 14, further comprising:
    a plurality of drive electrodes;
    a plurality of sense electrodes,
    the at least one sense node formed by the crossing of one of the drive electrodes with one of the sense electrodes, the sense node formed by capacitive coupling of the one of the drive electrodes and the one of the sense electrodes.

18. The sensor panel device of claim 14, wherein the output circuitry applies a first and a second of the multiple different frequencies to a first channels of the sensor panel device and subsequently applies the first and the second of the multiple different frequencies to a second channel of the sensor panel device.

19. A mobile telephone incorporating the sensor panel device of claim 14.

20. A digital audio player incorporating the sensor panel device of claim 14.

21. The sensor panel of claim 14, wherein the at least one sense node is defined by a crossing of a drive line and a sense line, and the output circuitry is operatively connected to the drive line.

22. A method of acquiring an image of a sensor panel device having a plurality of event sensors, comprising:
   selecting at least a first and a second stimulus signal, at least one of the first and second stimulus signal selected to reduce effects of a noise environment of the sensor panel;
   applying the first stimulus signal having a first frequency to a first event sensor of the plurality of event sensors;
   receiving a first stimulus result comprising an output of the first event sensor to which the first stimulus signal was applied;
   applying the second stimulus signal having a second frequency to the first event sensor;
   receiving a second stimulus result comprising an output of the first event sensor to which the second stimulus signal was applied;
   the first and second frequencies different from one another and applied to the first event sensor to detect at least one of a touch, near touch, or hover event;
   generating a final value of the first event sensor based at least on the first and second stimulus results.

23. The method of claim 22, wherein the first and second frequencies are arranged in ascending or descending order.

24. The method of claim 22, further comprising offset compensating at least the first and second stimulus results.

25. The method of claim 22, wherein the generating step further comprises applying a filter to at least the first and second results.

26. The method of claim 25, wherein the filter uses an averaging algorithm.

27. The method of claim 25, wherein the filter uses a median value algorithm.

28. The method of claim 25, wherein the filter uses a majority rules algorithm.

29. The method of claim 22, wherein the selecting is done by adaptively selecting.

30. An apparatus for detecting events on a sensor panel device having a sensor panel surface, the sensor panel device having a plurality of drive electrodes and a plurality of sense electrodes and capacitive sensing nodes at the intersection of the drive and sense electrodes, each capacitive sensing node formed by the intersection of a drive line and a sense line, the apparatus comprising:
   a plurality of sensors configured to detect one or more events each sensor comprising a capacitive sensing node;
   output circuitry operatively connected to the plurality of sensors, the output circuitry configured to generate stimulus signals having predetermined waveforms, the stimulus signals selected to reduce effects of a noise environment of the sensor panel device, at least some of the predetermined waveforms having different frequencies, each sensor providing a plurality of different outputs corresponding to the different frequencies to detect the one or more events; and
   one or more analog channels operatively connected to the plurality of sensors, the one or more analog channels configured to generate distinct values representative of events occurring at distinct locations each distinct value based on the plurality of different outputs for each sensor.

31. The apparatus of claim 30, wherein the output circuitry comprises driver logic capable of driving the plurality of touch sensors with stimulus signals.

32. The apparatus of claim 30, wherein the plurality of sensors form one or more sensor rows located in distinct and non-overlapping areas.

33. The apparatus of claim 30, the plurality of sensors are arranged in rows and columns in the sensor panel, each column operatively connected to a different analog channel.

34. The apparatus of claim 30, further comprising a computing system that incorporates the apparatus, the computing system comprising:
   an event subsystem operatively connected to the plurality of sensors;
   an event panel processor operatively connected to the event subsystem; and
   a host processor operatively connected to the event panel processor.

35. The apparatus of claim 34, further comprising a cellular telephone that incorporates the computing system.

36. The apparatus of claim 34, further comprising a digital audio player that incorporates the computing system.

37. A method for detecting events on or about a touch sensitive surface, comprising:
   scanning an event sensor panel of event sensors organized in rows and columns by applying a stimulus having multiple different frequencies to one of the rows or columns, the stimulus being applied to detect a touching or near touching of an object on or over the touch sensitive surface, and at least one of the multiple different frequencies selected to reduce effects of a noise environment of the event sensor panel;
   during each event sensor panel scan of the rows or columns, coupling the other of the rows or columns of the event sensor panel to one or more analog channels to generate plural output values for the different frequencies representative of one or more events occurring at distinct locations at about the same time along the row or column being scanned; and
   determining a final output value based on all or a plurality of the plural output values.

38. The method of claim 37, further comprising generating the plural output values representative of one or more events within an event subsystem.

39. The method of claim 37 incorporated into a computing system.

40. The method of claim 37, incorporated into a mobile telephone.

41. The method of claim 37, incorporated into a digital audio player.

42. The method of claim 37, wherein the scanning is done by adaptively selecting the at least one of the multiple different frequencies.

43. An apparatus for detecting events on a sensor panel device having a sensor panel surface, the sensor panel device having a plurality of drive electrodes and a plurality of sense electrodes and capacitive sensing nodes at the intersection of the drive and sense electrodes, each capacitive sensing node formed by the intersection of a single drive line and a single sense line, the apparatus comprising:

a plurality of sensors configured to detect one or more events each sensor comprising a capacitive sensing node;

output circuitry operatively connected to the plurality of sensors, the output circuitry configured to generate stimulus signals having predetermined waveforms, the stimulus signals selected to reduce effects of previously determined noise data of the sensor panel device, at least some of the predetermined waveforms having different frequencies, each sensor providing a plurality of different outputs corresponding to the different frequencies to detect the one or more events; and one or more analog channels operatively connected to the plurality of sensors, the one or more analog channels configured to generate distinct values representative of events occurring at distinct locations each distinct value based on the plurality of different outputs for each sensor.

* * * * *

UNITED STATES PATENT AND TRADEMARK OFFICE
CERTIFICATE OF CORRECTION

| | | |
|---|---|---|
| PATENT NO. | : 8,659,568 B2 | Page 1 of 1 |
| APPLICATION NO. | : 13/553421 | |
| DATED | : February 25, 2014 | |
| INVENTOR(S) | : Christoph Horst Krah et al. | |

It is certified that error appears in the above-identified patent and that said Letters Patent is hereby corrected as shown below:

In the Claims:

At column 14, claim number 18, line number 67, please delete "channels" and insert -- channel --.

At column 16, claim number 33, line 13, please delete "claim 30 the plurality" and insert -- claim 30 wherein the plurality --.

At column 17, claim number 43, line 2, please delete "events each sensor comprising" and insert -- events, each sensor comprising --.

At column 17, claim number 43, line 16, please delete "distinct locations each distinct value" and insert -- distinct locations, each distinct value --.

Signed and Sealed this
Thirtieth Day of September, 2014

Michelle K. Lee
*Deputy Director of the United States Patent and Trademark Office*